(12) United States Patent
Zhou et al.

(10) Patent No.: US 12,502,285 B2
(45) Date of Patent: Dec. 23, 2025

(54) SURGICAL UPPER COMPUTER FOR TOTAL KNEE ARTHROPLASTY, AND TOTAL KNEE ARTHROPLASTY SYSTEM

(71) Applicant: TINAVI MEDICAL TECHNOLOGIES CO., LTD., Beijing (CN)

(72) Inventors: Yixin Zhou, Beijing (CN); Yongqiang Zhao, Beijing (CN); Hongwei Shi, Beijing (CN); Dejin Yang, Beijing (CN); Ye Tian, Beijing (CN); Bo Chen, Beijing (CN)

(73) Assignee: TINAVI MEDICAL TECHNOLOGIES CO., LTD., Beijing (CN)

( * ) Notice: Subject to any disclaimer, the term of this patent is extended or adjusted under 35 U.S.C. 154(b) by 685 days.

(21) Appl. No.: 17/891,517

(22) Filed: Aug. 19, 2022

(65) Prior Publication Data
US 2023/0181338 A1    Jun. 15, 2023

(30) Foreign Application Priority Data
Dec. 14, 2021   (CN) .......................... 202111531212.9

(51) Int. Cl.
*A61F 2/46* (2006.01)
*A61B 17/02* (2006.01)
*A61B 34/00* (2016.01)

(52) U.S. Cl.
CPC ............ *A61F 2/461* (2013.01); *A61B 17/025* (2013.01); *A61B 34/25* (2016.02);
(Continued)

(58) Field of Classification Search
CPC .......... A61B 17/025; A61B 2017/0268; A61B 2090/061; A61B 2090/064;
(Continued)

(56) References Cited

U.S. PATENT DOCUMENTS 9,844,335 B2 * 12/2017 Stein .................... A61B 5/4528
10,136,952 B2 * 11/2018 Couture ............. A61B 17/1675
(Continued)

FOREIGN PATENT DOCUMENTS

CN     105769119 A     7/2016
CN     107582167 A     1/2018
(Continued)

OTHER PUBLICATIONS

Search Report issued on Sep. 26, 2022, in corresponding International Application No. PCT/CN2022/104788, 9 pages.
(Continued)

*Primary Examiner* — Anu Ramana
(74) *Attorney, Agent, or Firm* — Maier & Maier, PLLC (57) ABSTRACT

A surgical upper computer for a total knee arthroplasty, and a total knee arthroplasty system, in the field of surgical devices. The surgical upper computer includes a processor, and a memory storing which, when executed, enable the processor to execute operating modes of the surgical upper computer, where the operating modes include: exhibiting information to be input, the information to be input including a dynamic change range of a joint flexion angle, and a relationship between the joint flexion angle and a pushing force applied or a gap formed between a femur and a tibia; applying a pushing force during a process of dynamically adjusting the joint flexion angle, and acquiring corresponding relationship data between the pushing force and the gap; and visually exhibiting the corresponding relationship data. Accordingly, the force and gap between soft tissues in the total knee arthroplasty can be acquired and exhibited in a reasonable manner.

9 Claims, 7 Drawing Sheets

(52) U.S. Cl.
CPC ............... *A61B 2017/0268* (2013.01); *A61F 2002/4632* (2013.01); *A61F 2002/4666* (2013.01); *A61F 2002/4668* (2013.01)

(58) Field of Classification Search
CPC ..... A61B 2034/2048; A61B 2562/0219; A61F 2/4657; A61F 2002/4632; A61F 2002/4666; A61F 2002/4668
See application file for complete search history.

(56) References Cited

U.S. PATENT DOCUMENTS

| | | | | |
|---|---|---|---|---|
| 10,206,791 | B2 * | 2/2019 | D'Lima | A61F 2/4657 |
| 10,285,683 | B2 * | 5/2019 | Plaskos | A61F 2/3859 |
| 10,321,904 | B2 * | 6/2019 | Plaskos | A61F 2/3859 |
| 10,729,417 | B2 * | 8/2020 | Cole | A61B 5/4528 |
| 10,849,609 | B2 * | 12/2020 | Plaskos | A61B 34/10 |
| 10,863,995 | B2 * | 12/2020 | Nielsen | A61B 5/1071 |
| 11,051,798 | B2 * | 7/2021 | Plaskos | A61F 2/3859 |
| 11,135,021 | B2 * | 10/2021 | Couture | A61B 34/25 |
| 11,173,049 | B2 * | 11/2021 | D'Lima | A61B 17/1764 |
| 11,185,425 | B2 * | 11/2021 | Trabish | A61B 17/025 |
| 11,291,437 | B2 * | 4/2022 | Trabish | A61F 2/461 |
| 11,369,358 | B2 * | 6/2022 | Plaskos | A61F 2/3859 |
| 11,684,392 | B2 * | 6/2023 | van der Walt | A61B 17/155 606/88 |
| 12,239,384 | B2 * | 3/2025 | Angibaud | A61B 34/25 |
| 2013/0110250 | A1 | 5/2013 | Li | |
| 2021/0236147 | A1 | 8/2021 | Cabot | |
| 2025/0000444 | A1 * | 1/2025 | Kang | A61B 17/025 |

FOREIGN PATENT DOCUMENTS

| | | |
|---|---|---|
| CN | 110638476 A | 1/2020 |
| CN | 111249002 A | 6/2020 |
| CN | 111345895 A | 6/2020 |
| CN | 111759312 A | 10/2020 |
| CN | 212438814 U | 2/2021 |
| CN | 112914726 A | 6/2021 |
| CN | 113116353 A | 7/2021 |
| CN | 113440155 A | 9/2021 |
| CN | 113440317 A | 9/2021 |
| JP | 2012040150 A | 3/2012 |
| WO | 2006078236 A1 | 7/2006 |

OTHER PUBLICATIONS

Search Report issued on Jun. 18, 2025, in corresponding Chinese Application No. 2021115312129, 7 pages.
Office Action issued on Jul. 1, 2025, in corresponding Chinese Application No. 202111531212.9, 3 pages.

* cited by examiner

| Exhibit, by means of the interactive interface, to the user a plurality of value ranges of the joint flexion angle, and data values of preset gaps formed between the femur and the tibia that are subjected to the pre-osteotomy, corresponding to the plurality of value ranges | S301 |

| In response to information input by the user, control the butting member and the push plate to form corresponding gaps between the femur and the tibia respectively within the plurality of value ranges of the joint flexion angle, and acquire data values of the pushing forces between the femur and the tibia | S303 |

| Visually exhibit a relationship between the data values of the pushing force and the joint flexion angle and a relationship between the data values of the gap and the joint flexion angle | S305 |

Exhibit, by means of the interactive interface, to the user a value range of the joint flexion angle and a data value of a fixed pushing force applied between the femur and the tibia that are subjected to the pre-osteotomy — S401

In response to information input by the user, control the butting member and the push plate to apply a fixed pushing force between the femur and the tibia within the value range of the joint flexion angle, and acquire a data value of the gap between the femur and the tibia — S403

Visually exhibit a relationship between the data value of the fixed pushing force and the joint flexion angle and/or a relationship between the data value of the gap and the joint flexion angle — S405

```
┌─────────────────────────────────────────┐
│ Exhibit, by means of the interactive     │
│ interface, to the user a value range of  │
│ the joint angle and a data value of a    │──── S501
│ fixed gap formed between the femur and   │
│ the tibia that are subjected to the      │
│ pre-osteotomy                            │
└─────────────────────────────────────────┘
                    │
                    ▼
┌─────────────────────────────────────────┐
│ In response to information input by the  │
│ user, control the butting member and the │
│ push plate to form a fixed gap between   │──── S503
│ the femur and the tibia within the value │
│ range of the joint angle, and acquire a  │
│ data value of the pushing force between  │
│ the femur and the tibia                  │
└─────────────────────────────────────────┘
                    │
                    ▼
┌─────────────────────────────────────────┐
│ Visually exhibit a relationship between  │
│ the data value of the pushing force and  │
│ the joint flexion angle and/or a         │──── S505
│ relationship between the data value of   │
│ the fixed gap and the joint flexion angle│
└─────────────────────────────────────────┘
```

SURGICAL UPPER COMPUTER FOR TOTAL KNEE ARTHROPLASTY, AND TOTAL KNEE ARTHROPLASTY SYSTEM

TECHNICAL FIELD

The present application relates to the field of surgical devices, and in particular, relates to a surgical upper computer for a total knee arthroplasty, and a total knee arthroplasty system.

BACKGROUND

Total knee arthroplasty (TKA) is a complicated orthopedic operation due to the complex composition of a knee joint, which includes a femur, a tibia, a patella, ligaments surrounding the joint, as well as muscles, cartilages, etc.

As one of the main approaches to the treatment of degenerative knee joint diseases, TKA has a surgical goal of restoring the alignment of a lower limb and the range of motion of a joint, thereby maintaining joint stability and reducing pains. Appropriate prosthesis alignment and soft tissue balance are keys to achieving the surgical goal.

In a traditional TKA, osteotomy is typically performed on the femur and tibia by using a method combining intramedullary and extramedullary positioning and gap balancing, and then, ligaments are released to achieve a tension balance. In actual operations, the traditional TKA largely depends on the feeling and experience of a surgeon, and presents a risk of insufficient or excessive release, which would in turn lead to complications such as limited joint movement or abnormal joint movement in a patient.

Releasing the ligaments is in effect a kind of damage to a human tissue structure. If the magnitude of soft tissue tension can be understood during a surgery, a proper adjustment would be made based on the tension during the osteotomy, such that no or few ligaments will be released after the fitting of a prosthesis, thereby protecting soft tissues.

SUMMARY

The present application provides a surgical upper computer for a total knee arthroplasty, and a total knee arthroplasty system, whereby corresponding relationship data of forces and gaps between the femur and the tibia is acquired by means of different operating modes and can be visually exhibited, such that a surgeon can quickly determine whether soft tissues are balanced according to the data or visualized information, and make an intraoperative adjustment.

According to one aspect of the present application, a surgical upper computer is provided for controlling a knee-joint soft tissue balance measurement apparatus and performing data acquisition in a total knee arthroplasty, wherein the measurement apparatus comprises a master machine and an accessory, the master machine comprises a butting member respectively acting on distal medial and lateral condyles of a femur and a push plate supporting a tibia, the surgical upper computer comprises: a processor, and a memory storing a plurality of computer programs which, when respectively executed by the processor, enable the processor to respectively execute a plurality of operating modes of the surgical upper computer, and the plurality of operating modes comprises: exhibiting, by means of an interactive interface, to a user information to be input, the information to be input comprising a dynamic change range of a joint flexion angle, and a relationship between the joint flexion angle and a pushing force applied between the femur and the tibia or a relationship between the joint flexion angle and a gap formed between the femur and the tibia; in response to information input by the user, controlling the butting member and the push plate to apply a pushing force between the femur and the tibia during a process of dynamically adjusting the joint flexion angle within the dynamic change range, and acquiring corresponding relationship data between the pushing force and the gap between the femur and the tibia; and visually exhibiting the corresponding relationship data.

According to some embodiments, the relationship between the joint flexion angle and the pushing force applied between the femur and the tibia comprises: configuring, according to a plurality of value ranges set in the dynamic change range, data values of the pushing force, corresponding to the plurality of value ranges, or a functional relationship between the joint flexion angle and the pushing force; and the relationship between the joint flexion angle and the gap formed between the femur and the tibia comprises: configuring, according to the plurality of value ranges set in the dynamic change range, data values of the gap, corresponding to the plurality of value ranges, or a functional relationship between the joint flexion angle and the gap.

According to some embodiments, the data values of the pushing force applied between the femur and the tibia and the data values of the gap between the femur and the tibia comprise: data values of a pushing force applied between a femur and a tibia that are subjected to a pre-cut osteotomy, and data values of a gap between the femur and the tibia; and data values of a pushing force applied between a femur and a tibia after prosthesis implantation and before spacer implantation, and data values of a gap between the femur and the tibia.

According to some embodiments, the data values of the pushing force and the data values of the gap, and a relationship between the data values of the pushing force and the joint flexion angle or a relationship between the data values of the pushing force and the joint flexion angle are under the plurality of joint flexion angles.

According to some embodiments, the plurality of computer programs comprise a first computer program which, when executed by the processor, enables the processor to execute a first operating mode of the surgical upper computer, and the first operating mode comprises: exhibiting, by means of a first interactive interface, to the user first information to be input, the first information to be input comprising the dynamic change range of the joint flexion angle, and data values, corresponding to the dynamic change range, of the pushing force applied between the femur and the tibia; in response to information input by the user, controlling the butting member and the push plate to apply corresponding pushing forces between the femur and the tibia during the process of dynamically adjusting the joint flexion angle within the dynamic change range, and acquiring data values of the gap between the femur and the tibia; and at least visually exhibiting the relationship between the data values of the gap and the joint flexion angle.

According to some embodiments, when a plurality of value ranges are set according to the dynamic change range of the joint flexion angle, the pushing forces corresponding to different value ranges of the joint flexion angle have different data values.

According to some embodiments, the plurality of computer programs comprise a second computer program which, when executed by the processor, enables the processor to execute a second operating mode of the surgical upper computer, and the second operating mode comprises: exhibiting, by means of a second interactive interface, to the user second information to be input, the second information to be input comprising the dynamic change range of the joint flexion angle, and a data value, corresponding to the dynamic change range, of a preset gap formed between the femur and the tibia; in response to information input by the user, controlling the butting member and the push plate to form a corresponding gap between the femur and the tibia during the process of dynamically adjusting the joint flexion angle within the dynamic change range, and acquiring a data value of the pushing force between the femur and the tibia; and at least visually exhibiting a relationship between the data value of the pushing force and the joint flexion angle.

According to some embodiments, when a plurality of value ranges are set according to the dynamic change range of the joint flexion angle, the gaps corresponding to different value ranges of the joint flexion angle have different data values.

According to some embodiments, the plurality of computer programs comprise a third computer program which, when executed by the processor, enables the processor to execute a third operating mode of the surgical upper computer, and the third operating mode comprises: exhibiting, by means of a third interactive interface, to the user third information to be input, the third information to be input comprising the dynamic change range of the joint flexion angle, and a data value of a fixed pushing force applied between the femur and the tibia; in response to information input by the user, controlling the butting member and the push plate to apply the fixed pushing force between the femur and the tibia during the process of dynamically adjusting the joint flexion angle within the dynamic change range, and acquiring a data value of the gap between the femur and the tibia; and at least visually exhibiting a relationship between the data value of the gap and the joint flexion angle.

According to some embodiments, the plurality of computer programs comprise a fourth computer program which, when executed by the processor, enables the processor to execute a fourth operating mode of the surgical upper computer, and the fourth operating mode comprises: exhibiting, by means of a fourth interactive interface, to the user fourth information to be input, the fourth information to be input comprising the dynamic change range of the joint flexion angle, and a data value of a fixed gap formed between the femur and the tibia; in response to information input by the user, controlling the butting member and the push plate to form the fixed gap between the femur and the tibia during the process of dynamically adjusting the joint flexion angle within the dynamic change range, and acquiring a data value of the pushing force between the femur and the tibia; and at least visually exhibiting a relationship between the data value of the pushing force and the joint flexion angle.

According to one aspect of the present application, a total knee arthroplasty system is provided, comprising the surgical upper computer as previously defined.

According to the embodiments of the present application, the angle, force and gap between the knee joint can be quantified and reasonably exhibited to facilitate the surgical operation of a surgeon and reduce the damage to a patient caused by ligament releasing.

It should be understood that the general description above and the detailed description below are merely exemplary, and are not intended to limit the present application.

BRIEF DESCRIPTION OF THE DRAWINGS

To describe the technical solutions in the embodiments of the present application more clearly, the following briefly introduces the accompanying drawings to be used in the description of the embodiments. Obviously, the accompanying drawings in the following description show merely some embodiments of the present application.

DETAILED DESCRIPTION OF THE EMBODIMENTS

Exemplary embodiments will now be described more thoroughly with reference to the accompanying drawings. However, the exemplary embodiments can be embodied in many forms and should not be construed as being limited to the embodiments set forth herein. On the contrary, these embodiments are provided to make the present application thorough and complete, and to fully convey the concept of the exemplary embodiments to a person skilled in the art. In the drawings, the same reference signs denote the same or similar parts, and therefore, their repeated description will be omitted.

The described features, structures or properties can be combined in one or more embodiments in any appropriate manner In the description below, many specific details are provided to present a thorough understanding of the embodiments of the present disclosure. However, a person skilled in the art will appreciate that the technical solutions of the present disclosure can be practiced without one or more of these specific details, or by using other means, components, materials, apparatuses, operations, etc. Under these circumstances, the commonly known structures, methods, apparatuses, implementations, materials, or operations will not be shown or described in detail.

The flow charts illustrated in the accompanying drawings are merely for exemplary explanation, and do not necessarily include all the content and operations/steps, nor do they have to be performed in an order as described. For example, some of the operations/steps can also be broken down, and some of the operations/steps can be combined or partially combined. Therefore, the actual order of execution may be changed according to the actual situation.

The terms "first", "second" and the like in the description, claims and above-mentioned drawings of the present application are for the purpose of distinguishing different objects, rather than describing a specific order. Furthermore, the terms "comprise" and "have" and any variations thereof are intended to cover non-exclusive inclusions. For example, a process, method, system, product or device including a series of steps or units is not limited to the listed steps or units, but optionally further includes unlisted steps or units, or optionally further includes other steps or units inherent to the process, method, product or device.

The present application provides a surgical upper computer, a knee-joint based soft tissue balance measurement apparatus, and a corresponding joint flexion angle measurement apparatus, which are used to acquire and exhibit the force and gap of soft tissues in the total knee arthroplasty in a reasonable manner, thereby helping a surgeon make a planned adjustment to reduce the number of osteotomy adjustments or the damage to ligaments while shortening the operation time.

A surgical upper computer for a total knee arthroplasty and a total knee arthroplasty system according to the embodiments of the present application will be illustrated in detail below with reference to the accompanying drawings.

Figure 1A:
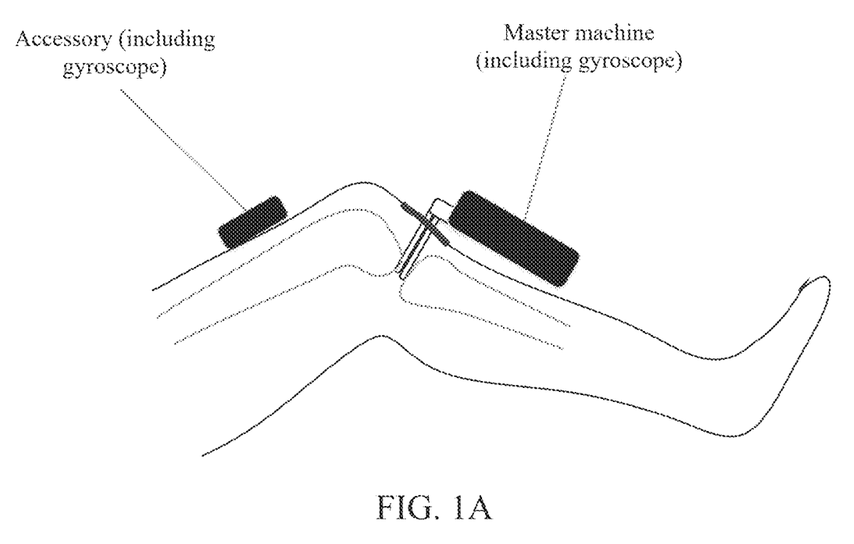
FIG. 1A illustrates a schematic diagram showing the installation of a knee-joint soft tissue balance measurement apparatus.

FIG. 1A illustrates a schematic diagram showing the installation of a knee-joint soft tissue balance measurement apparatus.

As shown in FIG. 1A, after a pre-cut osteotomy is performed on the tibia and/or femur of a patient, a master machine of the measurement apparatus is placed between the tibia and the femur of the patient, and the accessory of the measurement apparatus is placed on an upper surface of the thigh of the patient.

According to some embodiments, a gap of the knee joint and the elasticity of soft tissues may also be measured by using a knee-joint soft tissue balance measurement apparatus after a prosthesis is implanted between the tibia and the femur of the patient and before an insert is implanted.

According to some embodiments, the master machine and the accessory may each include a gyroscope, which may be used to measure a joint flexion angle of the patient.

Figure 1B:
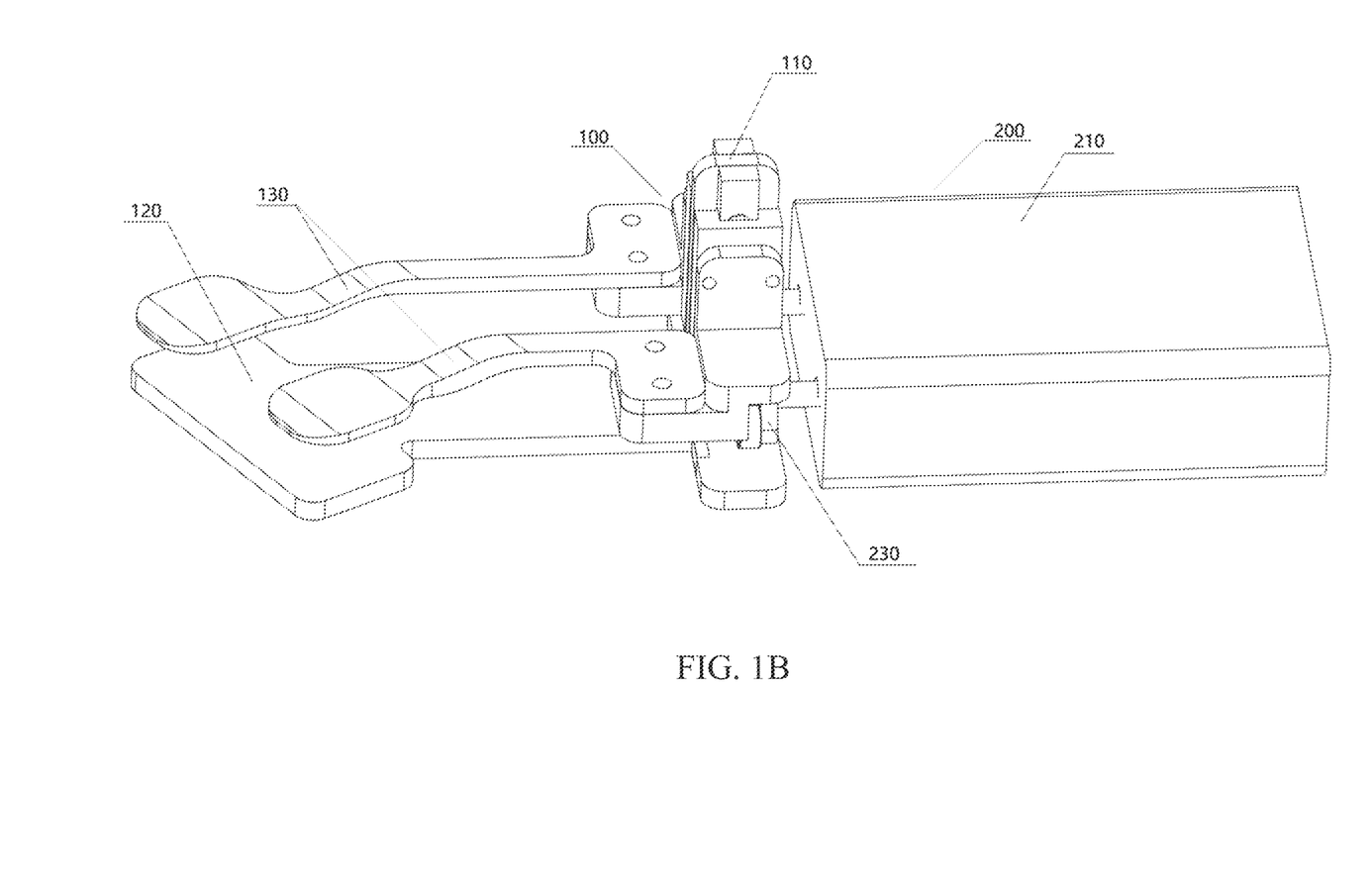
FIG. 1B illustrates a schematic stereoscopic view of a master machine of the knee-joint soft tissue balance measurement apparatus.

FIG. 1B illustrates a schematic stereoscopic view of a master machine of the knee-joint soft tissue balance measurement apparatus.

As shown in FIG. 1B, the master machine of the measurement apparatus includes a measurement module 100 and a drive module 200.

The measurement module 100 includes a mounting base 110, a push plate 120 for butting the tibia, and a butting member 130 for butting the femur.

With reference to a viewing angle in FIG. 1B, the push plate is fixedly connected to the mounting base; the butting member is connected to the mounting base in such a way that it can move in a longitudinal direction relative to the mounting base; an upper butting plate portion of the butting member and a lower butting plate portion of the push plate extend approximately in parallel and perpendicular to the longitudinal direction; and the upper butting plate portion is arranged above the lower butting plate portion in the longitudinal direction.

The drive module 200 includes a hermetic housing 210, a power unit and an actuation mechanism 230.

The power unit is disposed in the hermetic housing, the actuation mechanism is disposed outside the hermetic housing; the power unit hermetically passes through the hermetic housing and is in transmission connection with the actuation mechanism; and the actuation mechanism is constructed to removably cooperate with the measurement module for pushing the butting member to move longitudinally relative to the push plate.

According to some embodiments, the butting member respectively acts on the distal medial and lateral condyles of the femur to produce a medial pushing force and a lateral pushing force, and then form a medial gap and a lateral gap between the femur and the tibia.

The push plate is used for supporting the tibia to keep soft tissue balance.

Figure 2:
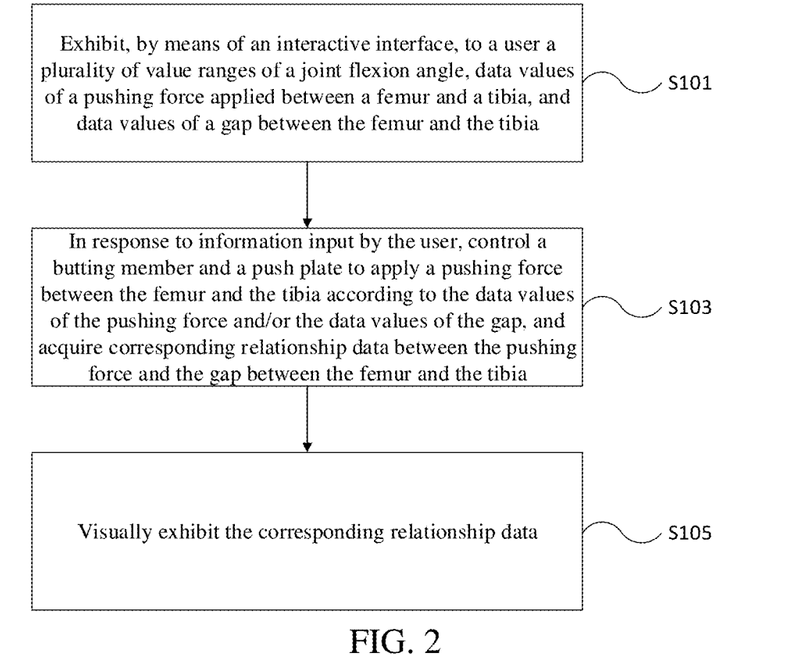
FIG. 2 illustrates a flow chart for operating a surgical upper computer according to an exemplary embodiment of the present application.

FIG. 2 illustrates a flow chart for operating a surgical upper computer according to an exemplary embodiment of the present application.

As shown in FIG. 2, in S101, by means of an interactive interface, a plurality of value ranges of the joint flexion angle, the data values of a pushing force applied between the femur and the tibia, or the data values of a gap between the femur and the tibia are exhibited to a user.

According to some embodiments, the data values of the pushing force applied between the femur and the tibia and the data values of the gap between the femur and the tibia include: the data values of a pushing force applied between the femur and the tibia that are subjected to a pre-cut osteotomy, or between the femur and the tibia after prosthesis implantation and before spacer implantation, and the data values of a gap between the femur and the tibia.

According to some embodiments, the pre-cut osteotomy includes performing an osteotomy on the tibia and/or femur, to facilitate adjustment and correction during a process of implanting a knee joint prosthesis.

After the prosthesis implantation and before the spacer implantation between the femur and the tibia, the prosthesis can be adjusted and corrected according to the data value of the pushing force applied between the femur and the tibia and the data value of the gap.

In S103, in response to information input by the user, the butting member and the push plate are controlled to apply a pushing force between the femur and the tibia according to the data value of the pushing force or the data value of the gap, and corresponding relationship data between the pushing force and the gap between the femur and the tibia is acquired.

According to some embodiments, the corresponding relationship data includes a relationship between the data value of the pushing force and the joint flexion angle and/or a relationship between the data value of the gap and the joint flexion angle.

Further, the data value of the pushing force may further include the data value of a fixed pushing force applied according to the value ranges of the joint flexion angle.

The data value of the gap further includes the data value of a fixed gap formed by applying a pushing force according to the value range of the joint flexion angle.

In S105, the corresponding relationship data is visually exhibited.

According to some embodiments, a surgical plan is adjusted according to visualized data exhibited by the interactive interface.

Further, adjusting the surgical plan includes implanting the knee joint prosthesis and spacer and adjusting the thickness of the prosthesis.

Figure 3:
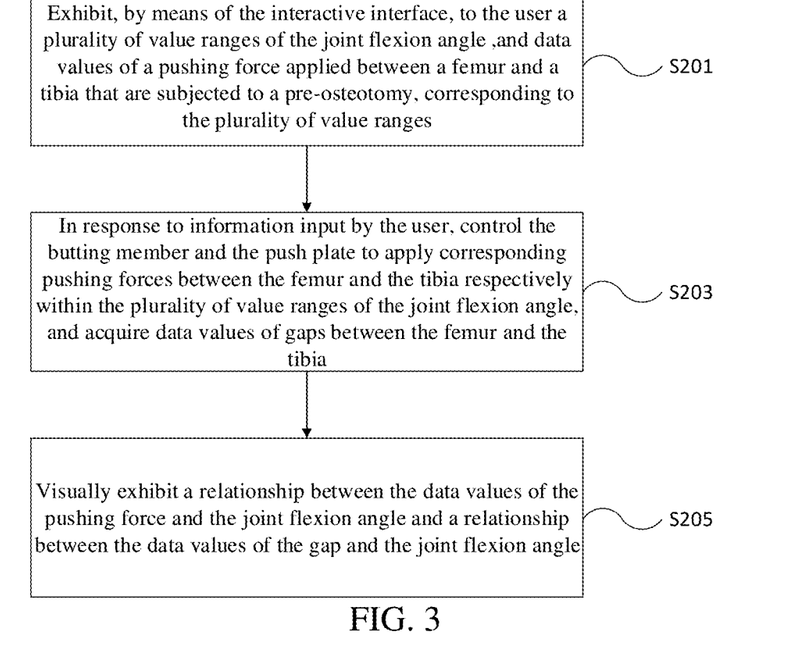
FIG. 3 illustrates a flow chart of a first operating mode of a surgical upper computer according to an exemplary embodiment of the present application.

FIG. 3 illustrates a flow chart of a first operating mode of a surgical upper computer according to an exemplary embodiment of the present application.

In S201, by means of a first interactive interface, the first information to be input is exhibited to a user. The first information to be input includes a plurality of value ranges of the joint flexion angle, and the data values of the pushing force applied between the femur and the tibia that are subjected to a pre-cut osteotomy, corresponding to the plurality of value ranges.

Figure 4A:
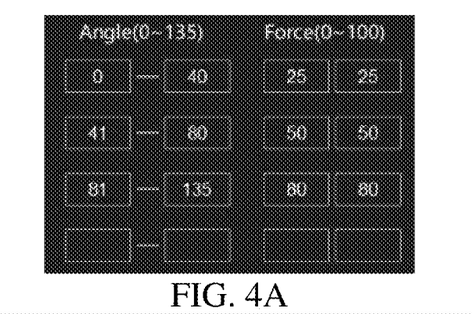
FIG. 4A illustrates a diagram exhibiting an interactive interface of a first operating mode of a surgical upper computer according to an exemplary embodiment of the present application.

The interactive interface is shown in FIG. 4A, and in the first operating mode of the surgical upper computer, the first information to be input includes the value range of a preset joint flexion angle, as well as the data values of medial and lateral pushing forces.

For example, the value range of the joint flexion angle may be set to 0° to 135°.

According to some embodiments, when the femur and tibia of the patient are in a straight position, the joint flexion angle is calibrated to 0°, and postflexed to the maximum joint flexion angle.

According to the value range of the joint flexion angle, the data value of the pushing force is set as follows:
 when the joint flexion angle is between 0° and 40°, the medial and lateral pushing forces are both set to 25 N;
 when the joint flexion angle is between 41° and 80°, the medial and lateral pushing forces are both set to 50 N; and
 when the joint flexion angle is between 81° and 135°, the medial and lateral pushing forces are both set to 80 N.

The settings of the joint flexion angle and the pushing force may also be acquired according to a preset functional relationship. For example, the joint flexion angle is in a sinusoidal function relationship with the pushing force.

In S203, in response to information input by the user, the butting member and the push plate are controlled to apply corresponding pushing forces between the femur and the tibia respectively within the plurality of value ranges of the joint flexion angle, and the data values of the gap between the femur and the tibia are acquired.

The femur and tibia of the patient are adjusted multiple times according to the value range of the joint flexion angle; the surgical upper computer transmits an instruction to the measurement apparatus according to data on the first interactive interface; a pushing force is applied by means of the butting member and push plate of the measurement apparatus; and multiple measurements are performed to acquire the data values of the medial and lateral pushing forces, as well as the data values of the corresponding medial and lateral gaps.

For example, when the joint flexion angle is 120°, the medial and lateral pushing forces are both measured to be 80 N, and the corresponding medial and lateral gaps are 23.22 and 17.47 respectively.

In S205, a relationship between the data value of the pushing force and the joint flexion angle and a relationship between the data value of the gap and the joint flexion angle are visually exhibited.

Figure 4B:
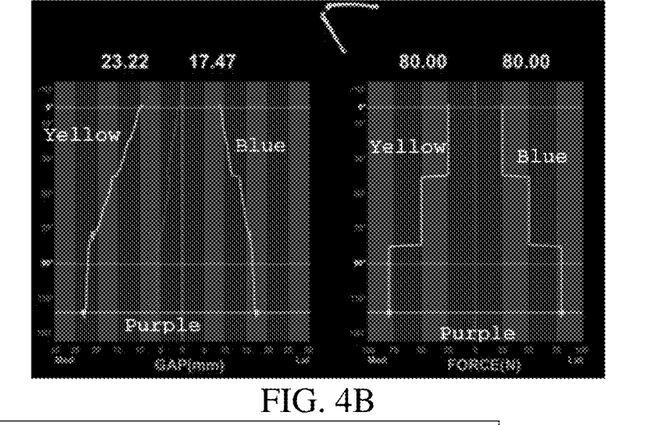
FIG. 4B illustrates a diagram exhibiting visualized information of a first operating mode of a surgical upper computer according to an exemplary embodiment of the present application.

As shown in FIG. 4B, the left panel illustrates the change curves of medial and lateral gaps of the knee joint in the first operating mode of the surgical upper computer, with the data value of the gap as the abscissa and the joint flexion angle as the ordinate, in which a yellow curve represents a medial gap, a blue curve represents a lateral gap, and a purple curve represents a gap difference value.

The right panel illustrates the change curves of a pushing force between the knee joint in the first operating mode of the surgical upper computer, with the data value of the pushing force as the abscissa and the joint flexion angle as the ordinate, in which a yellow curve represents a medial pushing force, a blue curve represents a lateral pushing force, and a purple curve represents a pushing force difference value.

Figure 5:
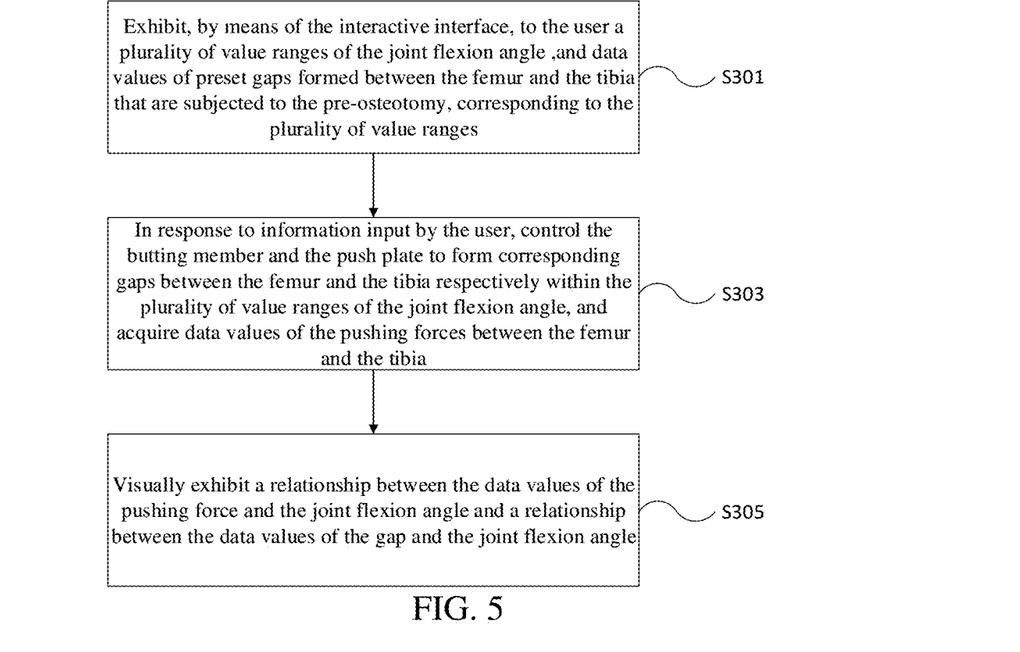
FIG. 5 illustrates a flow chart of a second operating mode of a surgical upper computer according to an exemplary embodiment of the present application.

FIG. 5 illustrates a flow chart of a second operating mode of a surgical upper computer according to an exemplary embodiment of the present application.

In S301, by means of a second interactive interface, second information to be input is exhibited to a user. The second information to be input includes a plurality of value ranges of the joint flexion angle, and the data values of the gap formed between the femur and the tibia that are subjected to a pre-cut osteotomy, corresponding to the plurality of value ranges.

Figure 6A:
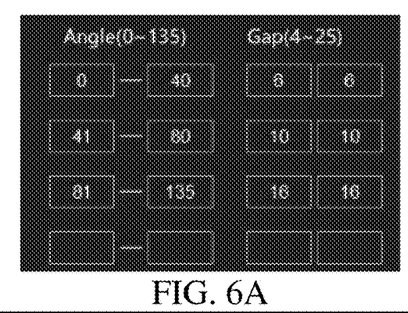
FIG. 6A illustrates a diagram exhibiting an interactive interface of a second operating mode of a surgical upper computer according to an exemplary embodiment of the present application.

The second interactive interface is shown in FIG. 6A, and in the second operating mode of the surgical upper computer, the second information to be input includes the value range of a preset joint flexion angle, as well as the data values of medial and lateral gaps.

For example, the value range of the joint flexion angle may be set to 0° to 135°.

According to some embodiments, when the femur and tibia of the patient are in a straight position, the joint flexion angle is calibrated to 0°, and postflexed to the maximum joint flexion angle.

According to the value range of the joint flexion angle, the data value of the gap is set as follows:
 when the joint flexion angle is between 0° and 40°, the medial and lateral gaps are both set to 6;
 when the joint flexion angle is between 41° and 80°, the medial and lateral gaps are both set to 10; and
 when the joint flexion angle is between 81° and 135°, the medial and lateral gaps are both set to 16.

The settings of the joint flexion angle and the gap may also be acquired according to a preset functional relationship. For example, the joint flexion angle is in a sinusoidal function relationship with the gap.

In S303, in response to information input by the user, the butting member and the push plate are controlled to form corresponding gaps between the femur and the tibia respectively within the plurality of value ranges of the joint flexion angle, and the data values of the pushing force between the femur and the tibia are acquired.

The femur and tibia of the patient are adjusted multiple times according to the value range of the joint flexion angle; the surgical upper computer transmits an instruction to the measurement apparatus according to data on the interactive interface; a pushing force is applied by means of the butting member and push plate of the measurement apparatus; and multiple measurements are performed to acquire the data values of the medial and lateral gaps, as well as the data values of the corresponding medial and lateral pushing forces.

For example, when the joint flexion angle is 120°, the medial and lateral gaps are both measured to be 16, and the corresponding medial and lateral pushing forces are 73.00 N and 93.50 N respectively.

In S305, a relationship between the data value of the pushing force and the joint flexion angle and a relationship between the data value of the gap and the joint flexion angle are visually exhibited.

Figure 6B:
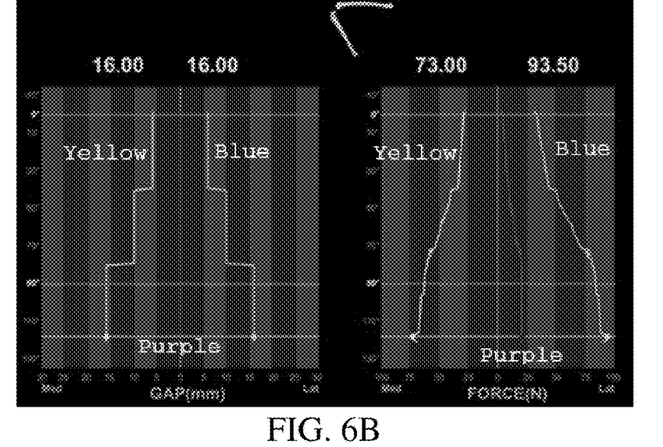
FIG. 6B illustrates a diagram exhibiting visualized information of a second operating mode of a surgical upper computer according to an exemplary embodiment of the present application.

As shown in FIG. 6B, the left panel illustrates the change curves of medial and lateral gaps of the knee joint in the second operating mode of the surgical upper computer, with the data value of the gap as the abscissa and the joint flexion angle as the ordinate, in which a yellow curve represents a medial gap, a blue curve represents a lateral gap, and a purple curve represents a gap difference value.

The right panel illustrates the change curves of a pushing force between the knee joint in the second operating mode of the surgical upper computer, with the data value of the pushing force as the abscissa and the joint flexion angle as the ordinate, in which a yellow curve represents a medial pushing force, a blue curve represents a lateral pushing force, and a purple curve represents a pushing force difference value.

Figure 7:
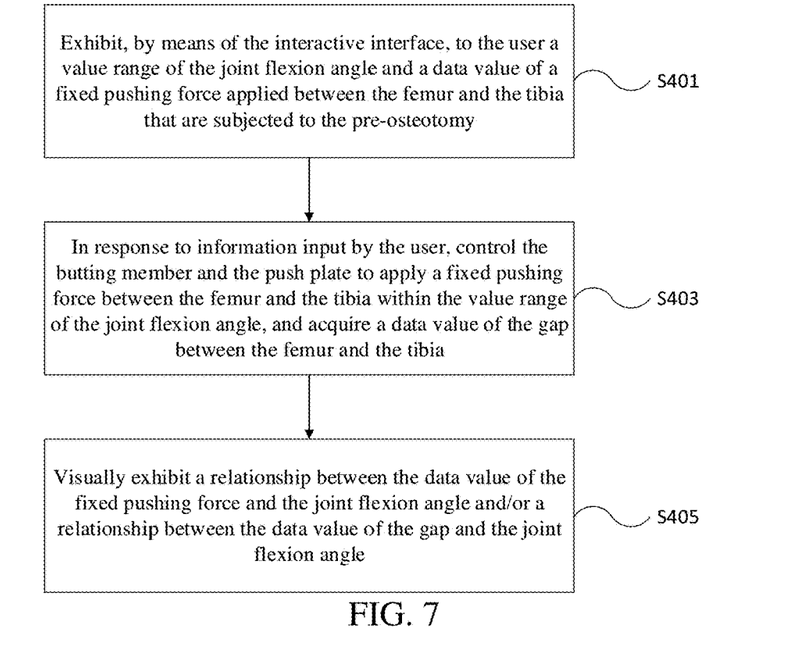
FIG. 7 illustrates a flow chart of a third operating mode of a surgical upper computer according to an exemplary embodiment of the present application.

FIG. 7 illustrates a flow chart of a third operating mode of a surgical upper computer according to an exemplary embodiment of the present application.

In S401, by means of a third interactive interface, third information to be input is exhibited to a user. The third information to be input includes the value range of the joint flexion angle and the data value of a fixed pushing force applied between the femur and the tibia that are subjected to the pre-cut osteotomy.

The third interactive interface is shown in FIG. 4A, and in the third operating mode of the surgical upper computer, the third information to be input includes the value range of a preset joint flexion angle, as well as the data values of medial and lateral pushing forces.

For example, the value range of the joint flexion angle is between 0° and 135°, and at any joint flexion angle within the value range, the medial and lateral pushing forces are both set to a fixed value of 18 N.

In S403, in response to information input by the user, the butting member and the push plate are controlled to apply a fixed pushing force between the femur and the tibia within the value range of the joint flexion angle, and the data value of the gap between the femur and the tibia is acquired.

The femur and tibia of the patient are adjusted multiple times according to the value range of the joint flexion angle; the surgical upper computer transmits an instruction to the measurement apparatus according to data on the interactive interface; a pushing force is applied by means of the butting member and push plate of the measurement apparatus; and multiple measurements are performed to acquire the data values of the medial and lateral pushing forces, as well as the data values of the corresponding medial and lateral gaps.

For example, when the joint flexion angle is 96°, the medial and lateral pushing forces are measured to be 18.60 N and 18.90 N respectively, and the corresponding medial and lateral gaps are 13.50 and 12.10 respectively.

Generally, the measurement apparatus vibrates due to interference factors (such as the friction between contact surfaces) in actual use, resulting in a possible error occurring to the actually measured data (the actually measured medial and lateral pushing forces) as compared with theoretical values (the medial and lateral pushing forces set to fixed values in the surgical upper computer).

In S405, a relationship between the data value of the fixed pushing force and the joint flexion angle and a relationship between the data value of the gap and the joint flexion angle are visually exhibited.

Figure 8:
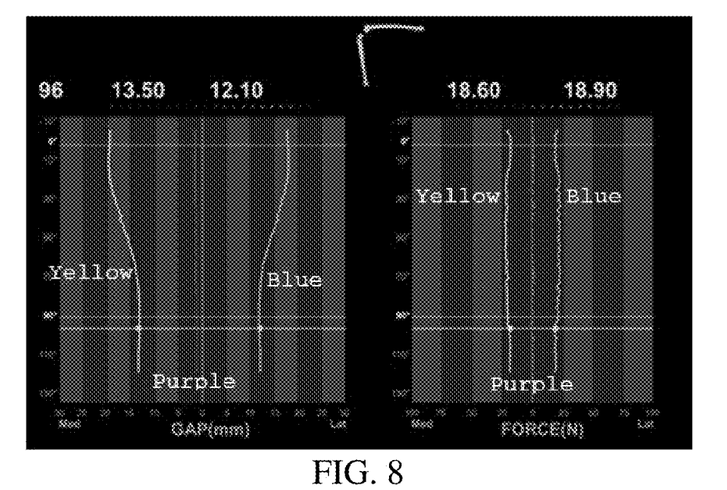
FIG. 8 illustrates a diagram exhibiting visualized information of a third operating mode of a surgical upper computer according to an exemplary embodiment of the present application.

As shown in FIG. 8, the left panel illustrates the change curves of medial and lateral gaps of the knee joint in the third operating mode of the surgical upper computer, with the data value of the gap as the abscissa and the joint flexion angle as the ordinate, in which a yellow curve represents a medial gap, a blue curve represents a lateral gap, and a purple curve represents a gap difference value.

The right panel illustrates the change curves of a pushing force between the knee joint in the third operating mode of the surgical upper computer, with the data value of the pushing force as the abscissa and the joint flexion angle as the ordinate, in which a yellow curve represents a medial pushing force, a blue curve represents a lateral pushing force, and a purple curve represents a pushing force difference value.

Figure 9:
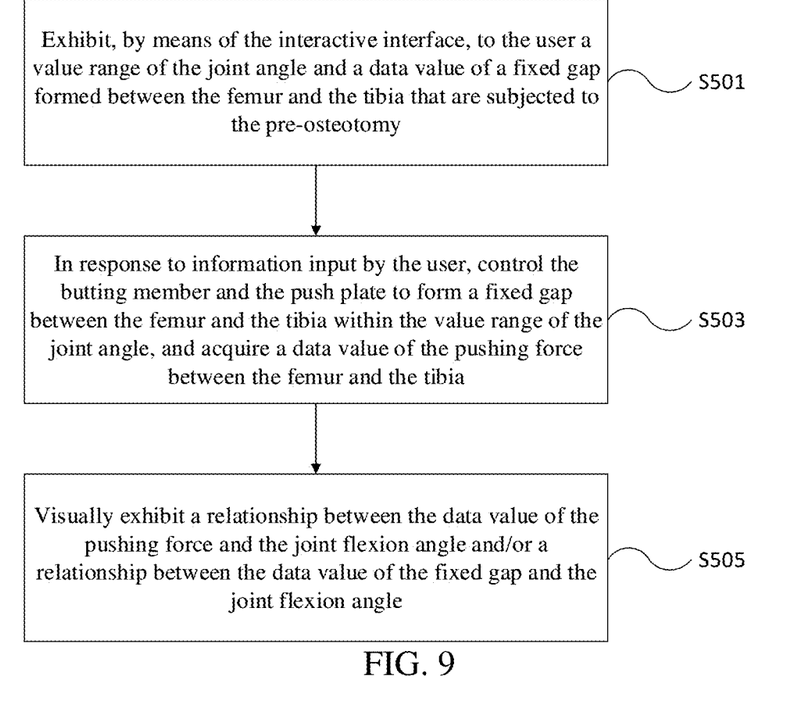
FIG. 9 illustrates a flow chart of a fourth operating mode of a surgical upper computer according to an exemplary embodiment of the present application.

FIG. 9 illustrates a flow chart of a fourth operating mode of a surgical upper computer according to an exemplary embodiment of the present application.

In S501, by means of a fourth interactive interface, fourth information to be input is exhibited to a user. The fourth information to be input includes the value range of the joint flexion angle and the data value of a fixed gap formed between the femur and the tibia that are subjected to the pre-cut osteotomy.

A reference may be made to FIG. 6A for the fourth interactive interface, and in the fourth operating mode of the surgical upper computer, the fourth information to be input includes the value range of a preset joint flexion angle, as well as the data values of medial and lateral gaps.

For example, the value range of the joint flexion angle is between 0° and 135°, and at any joint flexion angle within the value range, the medial and lateral gaps are both set to a fixed value of 12.

In S503, in response to information input by the user, the butting member and the push plate are controlled to form a fixed gap between the femur and the tibia within the value range of the joint flexion angle, and the data value of the pushing force between the femur and the tibia is acquired.

The femur and tibia of the patient are adjusted multiple times according to the value range of the joint flexion angle; the surgical upper computer transmits an instruction to the measurement apparatus according to data on the interactive interface; a pushing force is applied by means of the butting member and push plate of the measurement apparatus; and multiple measurements are performed to acquire the data values of the medial and lateral gaps, as well as the data values of the corresponding medial and lateral pushing forces.

For example, when the joint flexion angle is 120°, the medial and lateral gaps are both measured to be 12.00, and the corresponding medial and lateral pushing forces are 57.70 N and 57.70 N respectively.

Generally, the measurement apparatus vibrates due to interference factors (such as the friction between contact surfaces) in actual use, resulting in a possible error occurring to the actually measured data (the actually measured medial and lateral pushing forces) as compared with theoretical values (the corresponding medial and lateral pushing forces acquired according to the medial and lateral gaps that are set to fixed values in the surgical upper computer).

In S505, a relationship between the data value of the pushing force and the joint flexion angle and a relationship between the data value of the fixed gap and the joint flexion angle are visually exhibited.

Figure 10:
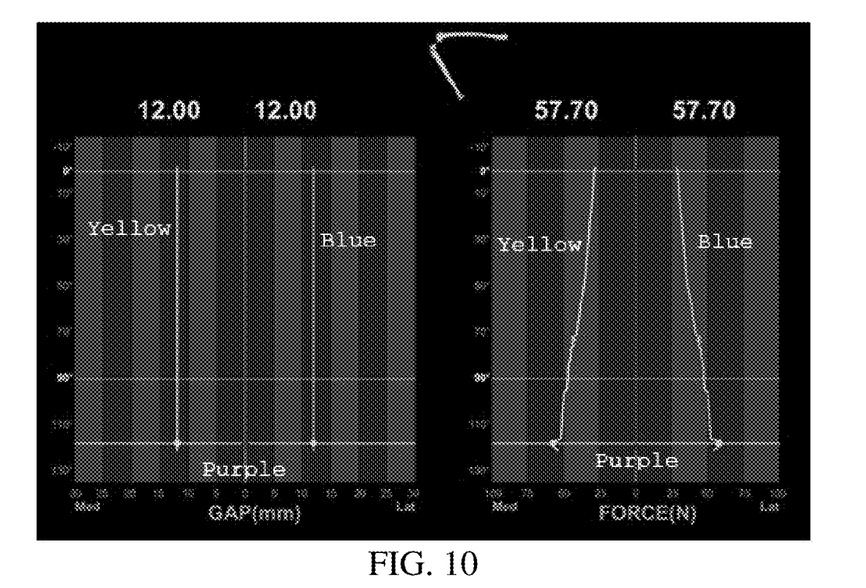
FIG. 10 illustrates a diagram exhibiting visualized information of a fourth operating mode of a surgical upper computer according to an exemplary embodiment of the present application.

As shown in FIG. 10, the left panel illustrates the change curves of medial and lateral gaps of the knee joint in the fourth operating mode of the surgical upper computer, with the data value of the gap as the abscissa and the joint flexion angle as the ordinate, in which a yellow curve represents a medial gap, a blue curve represents a lateral gap, and a purple curve represents a gap difference value.

The right panel illustrates the change curves of a pushing force between the knee joint in the fourth operating mode of the surgical upper computer, with the data value of the pushing force as the abscissa and the joint flexion angle as the ordinate, in which a yellow curve represents a medial pushing force, a blue curve represents a lateral pushing force, and a purple curve represents a pushing force difference value.

Figure 11:
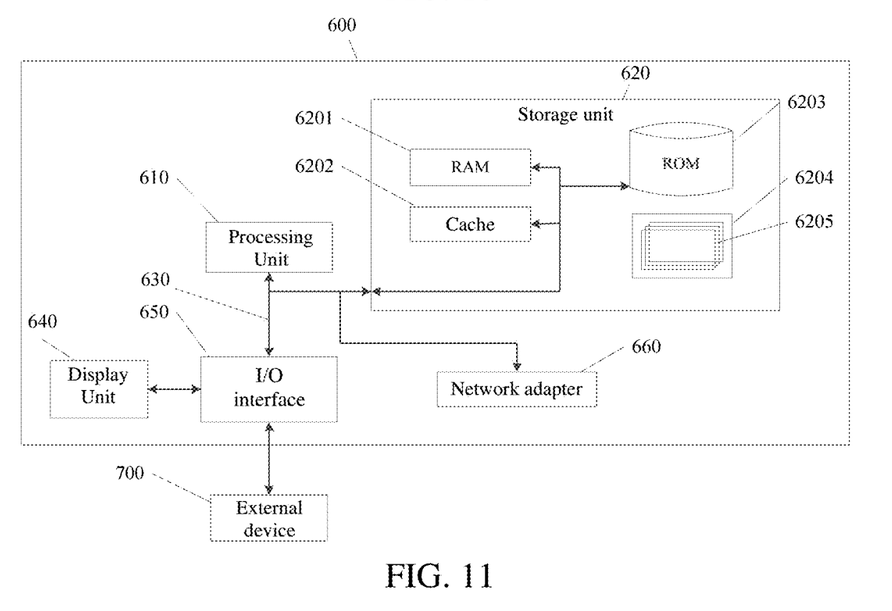
FIG. 11 illustrates a block diagram of a surgical upper computer according to an exemplary embodiment of the present application.

FIG. 11 illustrates a block diagram of a surgical upper computer according to an exemplary embodiment of the present application.

As shown in FIG. 11, an electronic device 600 is merely an example, and should not impose any limitation to the function and application range of the embodiments of the present application.

As shown in FIG. 11, the electronic device 600 is embodied in the form of a general-purpose computing device. The electronic device 600 may include but are not limited to the following components: at least one processing unit 610, at least one storage unit 620, a bus 630 connecting different system components (including the storage unit 620 and the processing unit 610), a display unit 640, etc. The storage unit stores a program code, which can be executed by the processing unit 610 such that the processing unit 610 executes the methods according to various exemplary embodiments of the present application as described in the description. For example, the processing unit 610 may execute the method as shown in FIG. 2.

The storage unit 620 may include a readable medium in the form of a volatile storage unit, for example, a random access memory (RAM) 6201 and/or a cache memory 6202, and may further include a read-only memory (ROM) 6203.

The storage unit 620 may further include a program/utility 6204 having a set of (at least one) program modules 6205, which include, but are not limited to: an operating system, one or more application programs, other program modules and program data. Each of or a combination of these examples may include the implementation of a network environment.

The bus 630 may represent one or more of several types of bus structures, including a storage unit bus or a storage unit controller, a peripheral bus, a graphics acceleration port, a processing unit, or a local area bus using any of a variety of bus structures.

The electronic device 600 may also communicate with one or more external devices 700 (for example, a keyboard, a pointing device, a Bluetooth device, etc.), and may also communicate with one or more devices that enables a user to interact with the electronic device 600, and/or communicate with any device (for example, a router, a modem, etc.) that enables the electronic device 600 to communicate with one or more other computing devices. Such communication may be performed via an input/output (I/O) interface 650. Moreover, the electronic device 600 may also communicate with one or more networks (for example, a local area network (LAN), a wide area network (WAN), and/or a public network, such as the Internet) via a network adapter 660. The network adapter 660 may communicate with other modules of the electronic device 600 via the bus 630. It should be understood that, although not illustrated in the drawings, other hardware and/or software modules used in combination with the electronic device 600 may include, but are not limited to: a microcode, a device driver, a redundant processing unit, an external disk drive array, a RAID system, a tape driver and a data backup storage system, etc.

From the description of the above embodiments, a person skilled in the art can easily understand that the exemplary embodiments described herein may be implemented by software, or by combining the software with necessary hardware. The technical solutions according to the embodiments of the present application may be embodied in the form of software products, which may be stored in a non-volatile storage medium (which may be a CD-ROM, a USB flash disk, a mobile hard disk, etc.) or on the network and may include several instructions to enable a computing device (which may be a personal computer, a server, a mobile terminal, or a network device, etc.) to execute the method according to the embodiment of the present application.

The software product may be a readable medium or a combination of several readable mediums. The readable medium may be a readable signal medium or a readable storage medium. The readable storage medium may be, for example, but not limited to, electric, magnetic, optical, electromagnetic, infrared, or semiconductor systems, apparatuses or device, or a combination of any of the above. More specific examples (non-exhaustive list) of the readable storage medium include: an electric connection having one or more wires, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

A computer-readable storage medium may include a data signal propagated in a baseband or as part of a carrier, and a readable program code is carried in the data signal. Such a propagated data signal may be in a variety of forms, including but not limited to an electromagnetic signal, an optical signal, or any suitable combination of the above. The readable storage medium may also be any readable medium other than a readable storage medium, and this readable medium may transmit, propagate, or transport a program that is used by or in combination with an instruction execution system, apparatus, or device. A program code contained in the readable storage medium may be transmitted by using any suitable medium, which includes, but is not limited to, wireless means, wired means, optical fiber cables, RF, etc., or any suitable combination of the above.

The program code for executing the operations in the present application may be written in one or any combination of multiple programming languages, which include object-oriented programming languages, such as Java, C++, etc., and further include conventional procedural programming languages, such as "C" language or similar programming languages. The program code may be executed completely on the computing device of a user, partially on user equipment, as a stand-alone software package, partially on the computing device of the user and partially on a remote computing device, or completely on the remote computing device or server. In a situation where the remote computing device is involved, the remote computing device may be connected to the computing device of the user through any networks, including a local area network (LAN) or a wide area network (WAN), or may be connected to an external computing device (for example, via Internet by using an Internet service provider).

The above-mentioned computer-readable medium carries one or more programs which, when executed by one of the devices, enables the computer-readable medium to implement the foregoing functions.

A person skilled in the art can understand that the above-mentioned modules can be either distributed in the apparatus according to the description of the embodiment, or changed accordingly to be disposed in one or more apparatuses that are different from this embodiment. The modules in the above-mentioned embodiments can be combined into one module, or may be further split into a plurality of sub-modules.

According to some embodiments of the present application, the angle, force and gap between the knee joint can be quantified and reasonably exhibited in the present application to facilitate the surgical operation of a surgeon and reduce the damage to a patient caused by ligament releasing, such that whether the soft tissue balance is achieved can be determined quickly and the service life of a prosthesis can be prolonged.

The embodiments of the present application are described in detail above. The description of the embodiments above is merely for the purpose of helping understand the methods and their core concepts of the present application. Meanwhile, alternations or variations made by those skilled in the art in accordance with the concept of the present application and based on the specific embodiments and application scope of the present application shall fall within the protection scope of the present application. In summary, the content of the description should not be understood as a limitation to the present application.

What is claimed is:

1. A surgical upper computer for controlling a knee-joint soft tissue balance measurement apparatus and performing data acquisition in a total knee arthroplasty, the measurement apparatus comprising a master machine and an accessory, the master machine and the accessory each comprising a gyroscope used to measure a joint flexion angle, the master machine comprising a butting member respectively acting on distal medial and lateral condyles of a femur and a push plate supporting a tibia, the surgical upper computer comprising:
   a processor; and
   a memory storing a plurality of computer programs which, when respectively executed by the processor, enable the processor to respectively execute a plurality of operating modes of the surgical upper computer, the plurality of operating modes comprising:
   exhibiting, by an interactive interface, to a user, information to be input, the information to be input comprising a dynamic change range of a joint flexion angle, and a relationship between the joint flexion angle and a pushing force applied between the femur and the tibia or a relationship between the joint flexion angle and a gap formed between the femur and the tibia;
   in response to information input by the user, controlling the butting member and the push plate to apply a pushing force between the femur and the tibia during a process of dynamically adjusting the joint flexion angle within the dynamic change range, and acquiring corresponding relationship data between the pushing force and the gap between the femur and the tibia; and
   visually exhibiting the corresponding relationship data;
   wherein a plurality of value ranges of the joint flexion angle is set in the dynamic change range;
   wherein the relationship between the joint flexion angle and the pushing force applied between the femur and the tibia is providing data values of the pushing force, corresponding to the plurality of value ranges of the joint flexion angle, or relationship between the joint flexion angle and the pushing force applied between the femur and the tibia comprises a functional relationship between the joint flexion angle and the pushing force; and
   wherein the relationship between the joint flexion angle and the gap formed between the femur and the tibia is providing data values of the gap, corresponding to the plurality of value ranges of the joint flexion angle, or the relationship between the joint flexion angle and the gap formed between the femur and the tibia comprises a functional relationship between the joint flexion angle and the gap.

2. The surgical upper computer according to claim 1, wherein the data values of the pushing force applied between the femur and the tibia and the data values of the gap between the femur and the tibia comprise:
   data values of a pushing force applied between a femur and a tibia having been subjected to a pre-cut osteotomy, and data values of a gap between the femur and the tibia; or
   data values of a pushing force applied between a femur and a tibia after prosthesis implantation and before spacer implantation, and data values of a gap between the femur and the tibia.

3. The surgical upper computer according to claim 1, wherein the plurality of computer programs comprises a first computer program which, when executed by the processor, enables the processor to execute a first operating mode of the surgical upper computer, and the first operating mode comprises:
   exhibiting, by a first interactive interface, to the user, first information to be input, the first information to be input comprising the dynamic change range of the joint flexion angle, and data values, corresponding to the dynamic change range, of the pushing force applied between the femur and the tibia;
   in response to information input by the user, controlling the butting member and the push plate to apply corresponding pushing forces between the femur and the tibia during the process of dynamically adjusting the joint flexion angle within the dynamic change range, and acquiring data values of the gap between the femur and the tibia; and
   at least visually exhibiting a relationship between the data values of the gap and the joint flexion angle.

4. The surgical upper computer according to claim 3, wherein, when a plurality of value ranges of the joint flexion angle is set according to the dynamic change range of the joint flexion angle, the pushing forces corresponding to different value ranges of the joint flexion angle have different data values.

5. The surgical upper computer according to claim 1, wherein the plurality of computer programs comprises a second computer program which, when executed by the processor, enables the processor to execute a second operating mode of the surgical upper computer, and the second operating mode comprises:

exhibiting, by a second interactive interface, to the user, second information to be input, the second information to be input comprising the dynamic change range of the joint flexion angle, and a data value, corresponding to the dynamic change range, of a preset gap formed between the femur and the tibia;

in response to information input by the user, controlling the butting member and the push plate to form corresponding gaps between the femur and the tibia during the process of dynamically adjusting the joint flexion angle within the dynamic change range, and acquiring data values of the pushing force between the femur and the tibia; and     at least visually exhibiting a relationship between the data values of the pushing force and the joint flexion angle.

6. The surgical upper computer according to claim 5, wherein, when a plurality of value ranges of the joint flexion angle is set according to the dynamic change range of the joint flexion angle, the gaps corresponding to different value ranges of the joint flexion angle have different data values.

7. The surgical upper computer according to claim 1, wherein the plurality of computer programs comprises a third computer program which, when executed by the processor, enables the processor to execute a third operating mode of the surgical upper computer, and the third operating mode comprises:

exhibiting, by a third interactive interface, to the user, third information to be input, the third information to be input comprising the dynamic change range of the joint flexion angle, and a data value of a fixed pushing force applied between the femur and the tibia;

in response to information input by the user, controlling the butting member and the push plate to apply the fixed pushing force between the femur and the tibia during the process of dynamically adjusting the joint flexion angle within the dynamic change range, and acquiring data values of the gap between the femur and the tibia; and     at least visually exhibiting a relationship between the data values of the gap and the joint flexion angle.

8. The surgical upper computer according to claim 1, wherein the plurality of computer programs comprises a fourth computer program which, when executed by the processor, enables the processor to execute a fourth operating mode of the surgical upper computer, and the fourth operating mode comprises:

exhibiting, by a fourth interactive interface, to the user, fourth information to be input, the fourth information to be input comprising the dynamic change range of the joint flexion angle, and a data value of a fixed gap formed between the femur and the tibia;

in response to information input by the user, controlling the butting member and the push plate to form the fixed gap between the femur and the tibia during the process of dynamically adjusting the joint flexion angle within the dynamic change range, and acquiring data values of the pushing force between the femur and the tibia; and     at least visually exhibiting a relationship between the data values of the pushing force and the joint flexion angle.

9. A total knee arthroplasty system, comprising the surgical upper computer of claim 1.

\* \* \* \* \*